United States Patent [19]
Langenfeld

[11] 4,114,657
[45] Sep. 19, 1978

[54] LARGE-DIAMETER INSULATED PIPE
[75] Inventor: Michel Langenfeld, Vandoeuvre, France
[73] Assignee: Pont-A-Mousson S.A., Nancy, France
[21] Appl. No.: 837,326
[22] Filed: Sep. 27, 1977
[30] Foreign Application Priority Data
Sep. 5, 1977 [FR] France .............................. 77 26877
[51] Int. Cl.² ............................................. F16L 11/08
[52] U.S. Cl. ................................... 138/109; 138/173; 277/DIG. 2; 285/149
[58] Field of Search ............... 138/109, 149, 155, 173, 138/121; 277/207 A, DIG. 2; 285/149
[56] References Cited
U.S. PATENT DOCUMENTS
3,508,768  4/1970  Hogan .................................. 138/109

Primary Examiner—Houston S. Bell, Jr.
Attorney, Agent, or Firm—Sughrue, Rothwell, Mion, Zinn and Macpeak

[57] ABSTRACT

The insulated pipe comprises an inner pipe and a foam of thermally insulating plastics material which adheres to the inner pipe and to an outer protective layer. The foam material covers the major part of the inner pipe but terminates at a distance from each end thereof in a portion having an inclined surface of frustoconical shape. The outer protective layer comprises a cover which is relatively rigid and terminates before reaching each frustoconical surface and a protective case for each frustoconical surface of the foam material. The case is at one end fixed to the cover and at the other end integral with the inner pipe. The case has sufficient elasticity to allow the foam to follow the expansion of the inner pipe while the cover remains immobilized.

18 Claims, 4 Drawing Figures

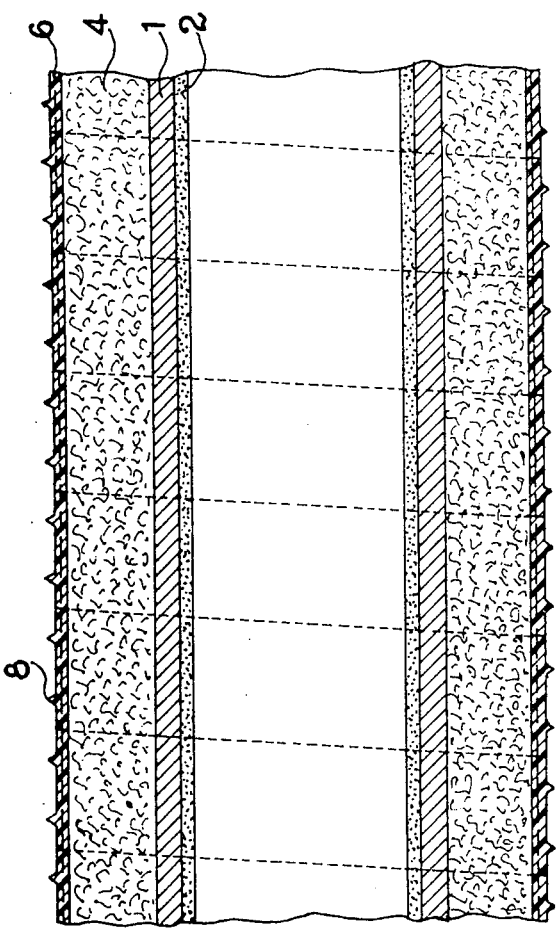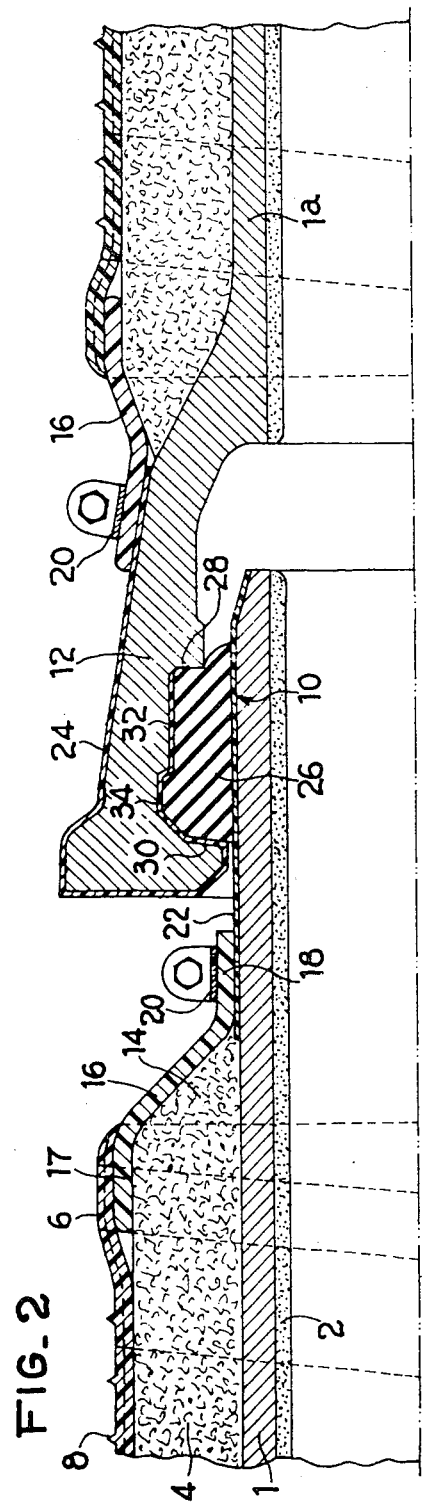

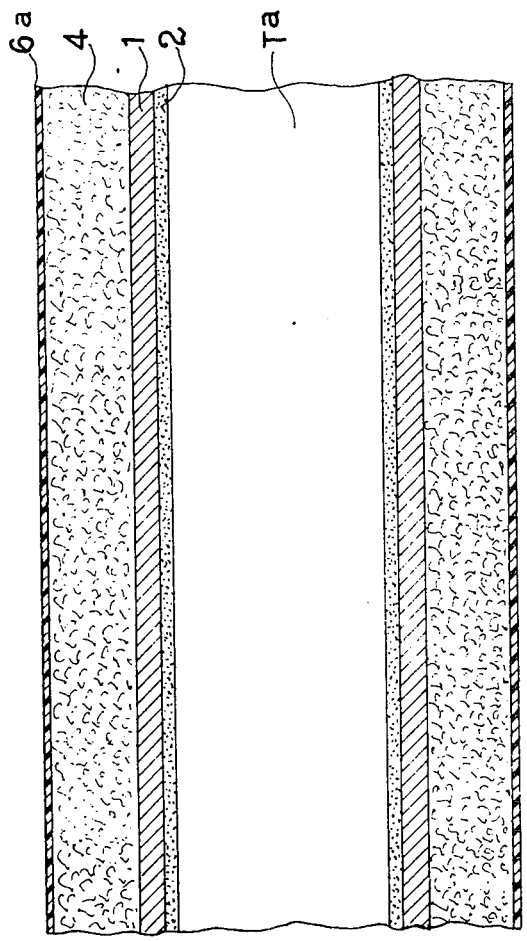
FIG_3
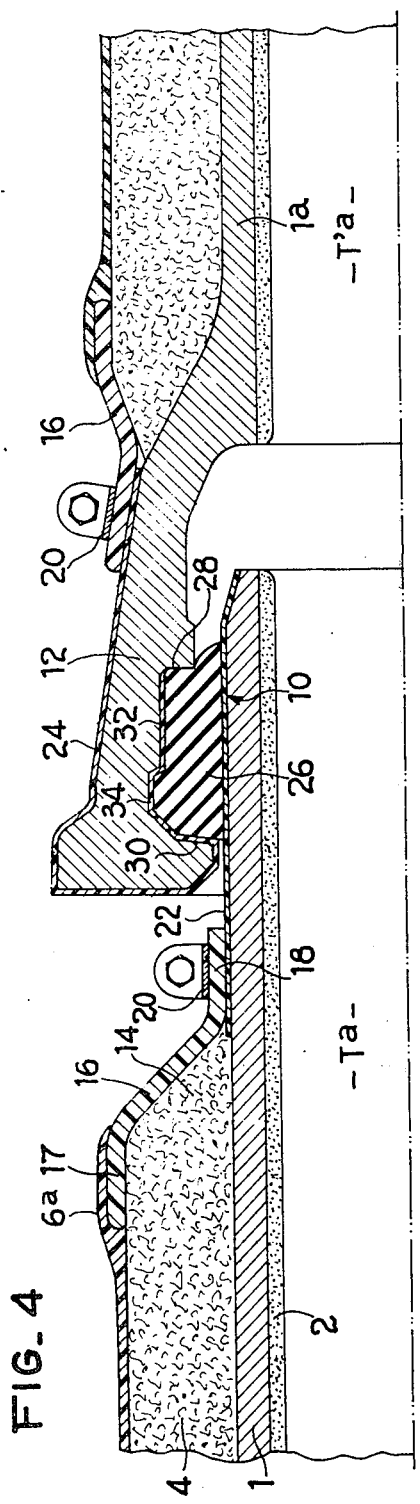
FIG_4

LARGE-DIAMETER INSULATED PIPE

The present invention relates to a large-diameter pipe intended to convey a fluid at high temperature over a long distance.

Heat insulated pipes are known. For example, French Pat. No. 2,042,814 discloses a pipe comprising a heat insulating foam of plastics material which adheres to the inner pipe and to an outer protective layer and which covers the major part of the pipe but terminates at a certain distance from each end of the pipe in an inclined frustoconical surface.

An object of the invention is to provide a pipe of the same type which is particularly adapted to the conveyance of hot fluids, that is to say has a free expansion capability.

According to the invention, there is provided a pipe of the aforementioned type, wherein the outer layer is constituted by a relatively rigid cover which terminates before each frustoconical surface and a case protecting each one of the frustoconical surfaces of the foam, which case at one end is fixed to the cover and at the other end is rendered directly integral with the inner pipe, said case having sufficient elasticity to enable the foam to follow the expansion of the inner pipe whereas the cover remains immobilized.

Consequently, the invention conciliates the two requirements of strength of the body part of the outer layer and differential movements of the foam between the surface of the inner pipe which expands and that of the outer layer which undergoes no expansion owing to the fact that it is anchored in the ground and is heat insulated.

In a first embodiment of the invention, the outer cover is formed by a strip of bitumen or a mixture of bitumen and an elastomer provided with a non-woven reinforcement which is helically wound around the foam of plastics material.

In a second embodiment of the invention, the cover is constituted by a layer of non-cellular polyurethane disposed around the layer of insulating foam by projection or spraying. This ensures that the cover is perfectly fluidtight and facilitates the manufacture of insulated pipe.

The ensuing description of two embodiments of the invention, given merely by way of example and shown in the accompanying drawings, will bring out the advantages and features of the invention.

In the drawings:

FIG. 1 is a partial axial sectional view of an insulated pipe according to the invention;

FIG. 2 is a half axial sectional view of the connection between the ends of two consecutive pipes having a socket according to the embodiments of FIG. 1;

FIG. 3 is a partial axial sectional view of an insulated pipe according to another embodiment of the invention, and FIG. 4 is a half axial sectional view of the connection between the ends of two consecutive pipes having a socket according to the embodiment of FIG. 3.

The insulated pipe T shown in FIG. 1 comprises an inner pipe 1 of cast iron, preferably spherodial graphite cast iron, termed ductile cast iron, which has a large diameter, that is to say a diameter which exceeds 300 mm and may be as much as 1,200 and even 1,600 mm. This pipe is adapted to convey hot water or like fluids at a high temperature which may be as much as 120° C over a distance of the order of 1 or more kilometers, the pipe being preferably buried in the ground.

The inner surface of the pipe 1 is provided with an inner coating 2, for example a coating of cement mortar the nature and quality of which are a function of the type of circuit in which the insulated pipe is mounted and the quality and nature of the fluid conveyed.

Adhering to the outer surface of the pipe 1 is a layer of insulating material constituted preferably by a relatively rigid polyurethane foam having a thickness of 30 to 50 mm. The polyurethane or other plastics material intended to form the insulating foam is deposited by a cold spraying or pulverization onto the pipe 1 which is driven in rotation. This plastics material has, for example, the composition proposed by the firm ENODIM under reference MR 2109 so that it strongly adheres to the cast iron. Further, the foam formed after this cold spraying onto the pipe has a higher density at the interfaces, that is, where it contacts the iron and on its outer surface than within the mass thereof. The foam thus formed has preferably densities of the order of 80 to 120 kg/cu.meter which imparts strength thereto without excessively raising the thermal conductivity thereof.

This layer of insulating foam 4 is surrounded by a protective cover 6 preferably comprising bitumen or a mixture of bitumen and elastomer and provided with a reinforcement, for example constituted by a web of non-woven polyester or glass. This cover is preferably the cover SOPRALENE furnished by the firm SOPREMA. It is helically wound hot onto the outer surface of the foam to which it adheres. This cover is indeed flexible enough to follow possible localized punching or deformation of the foam without breaking or cracking. It also resists perforation by roots or the like owing more particularly to the presence of the reinforcement of non-woven material. The tensile strength of this cover is of the order of 300 Newton/cm. Its elastic elongation is 8 to 10%.

On the surface of the cover opposed to the foam, the cover comprises anchoring projections 8 which are formed preferably by an incrustation of gravel in the surface of the cover (the gravel particle size being of course very small) and promote the anchoring of the cover in the ground. This gravel moreover precludes the sticking of the band intended to form the cover when the band is wound on a reel before it is placed in position on the site. Further, they hinder the action of ultraviolet rays which may be liable to deteriorate the component materials of the cover when it is exposed to light.

The cover 6 and the foam 4 do not cover the entire length of the pipe 1 but terminate at a distance from the ends of the latter so as to leave free the male or smooth end 10 and the socket 12 which are respectively provided at each end of the pipe and are adapted to connect the pipe with adjacent pipes. In the vicinity of each of these ends, the foam terminates in a surface 14 which is inclined with respect to the axis of the whole of the pipe and has a substantially frustoconical shape. This surface is covered with a case 16 of corresponding shape which is gripped under the cover 6 at one of the ends thereof and fixed to the pipe by both adhesion and a clamping collar 20 at the other end. The case 16 is made from a material capable of resisting high temperatures and in particular temperatures of the order of 120° contemplated for the operation of pipe. This material must also have a good tensile strength and sufficient flexibility to deform without being deteriorated under the effect of the thermal expansion of the pipe. Butyl rubber, or more particularly butyl, is a material which satisfies these requirements although it is possible to employ other rubbers for example ethylene-propylene rubber.

As shown in FIG. 2, when the insulated pipe of the invention is of the type employing a connecting socket and a radial compression of a sealing element, one of the ends thereof forms a smooth or male end whereas the other end forms a conical socket or female member 12.

The outer surface of the male end 10 is covered with a coating 22 which covers the whole of its surface and extends under the collar 20 and the end of the case 16. This coating is made from a material having both a low coefficient of friction with the elastomer sealing element and a sufficient mechanical performance to resist heating up to a temperature of the order of 120° C without losing the friction qualities thereof. This coating is preferably a fluorinated polymer or polyvinylidene difluoride generally designated by the initials PVDF. A coating of the same material or of a like material 24 also covers the outer surface of the socket 12 and extends under the collar 20 and the end 18 of the case 16. However, this coating is extended around the end of the socket 12 and over the inner surface of the latter. This inner surface has a cavity for housing a sealing element 26 adapted to be compressed between the male end 10 and the socket 12. The sealing element housing cavity is defined at the axially inner end thereof by an inner shoulder 28 of the socket 12 and, at the outer end thereof, by an abutment shoulder 30 formed at the entrance end of the socket 12. The inner end of the cavity is defined by a cylindrical surface 32 which may be cast but which is preferably bored so as to have diametral tolerances which are closer to a diameter which is a function of the desired compression of the sealing element 26 when connecting the two pipes. In the region of the abutment shoulder 30, the cylindrical surface 32 has a groove 34 in which a heel portion of the sealing element 26 is fitted so that the sealing element may be held stationary exactly in the position of utilization thereof. The active part of the sealing element is in contact with the surface 32.

As clearly shown in FIG. 2, when two adjacent ends of insulated pipes T and T' having a socket are interconnected, the male end 10 of one which is provided with the coating 22 is inserted in the socket 12 of the other and slides on the sealing element 26 which is compressed thereby. The diameter of the abutment shoulder 30 exceeds the outside diameter of the coating 22 of the male end 10 so that this male end easily penetrates the socket 12 with a small diametral clearance limiting any eccentricity and therefore the compression. Likewise, the diameter of the cylindrical surface 32 is so chosen as to ensure a radial compression of the sealing element 26 which is at least greater than 5% but does not exceed 25%, irrespective of the manufacturing tolerances of the male end. The sealing element 26 may be made by moulding from an ethylene-propylene-diane-methylene mixture or any other like material capable of resisting high temperatures, for example the materual "EPDM 5512" sold by the firm KLEBER COLOMBES.

The whole of the insulated pipe is made in the factory and may be easily stored and then transported at the moment of use. When used, a first pipe T is placed in the ground so that the outer cover 6 can anchor itself into the ground owing to the action of the gravel or other projections 8. Mounted on the male end 10 of this first pipe T is the socket 12 of a second pipe T' which is practically identical to the first pipe so that the sealing element 26 is gripped between these two pipes and seals the joint therebetween. An additional insulation (not shown) may then be placed around the head end of the socket 12 and the collars 20. An appropriate number of identical pipes are thus secured to each other to the desired length of piping. This length may be as much as for example several kilometers.

In the course of use, the water or other hot fluid flowing through the successive inner pipes 1 heats these pipes and causes the thermal expansion thereof. Under the effect of this expansion, the male end 10 tends to slide in the sealing element 26 inwardly of the socket 12. The nature of the coating 22 allows this sliding but nonetheless ensures a constant sealed contact therebetween and the sealing element so that the seal is in no way destroyed by the thermal expansion.

This expansion moreover deforms the insulating foam 4 at the interface thereof with the pipe 1 so that the foam can accompany the latter. On the other hand, the protective cover 6 remains perfectly fixed owing to the anchoring thereof and moreover remains relatively cold since it is insulated from the heat by the foam. However, the insulating foam 4 has sufficient flexibility to be able to deform and follow the expansion of the pipe 1 without becoming detached from the fixed cover 6. Moreover, the case 16 is also sufficiently elastic to adapt itself to the expansion of the pipe 1 while remaining solidly integral with the end of the cover 6, which allows the insulation to withstand a large thermal expansion with no danger of being deteriorated and consequently to retain its effectiveness for a long time.

Further, when the male end is inserted in the socket, it is easy to leave between these two elements a sufficient axial distance to allow a relatively large thermal expansion of the pipes when the whole of the piping rises in temperature. The expansions of each pipe are then absorbed at the point of connection with the neighbouring pipe with no danger of transmitting and accumulating the expansions from one pipe to the other and presenting serious drawbacks at certain points.

Consequently, the invention makes available a large-diameter insulated pipe which is manufactured in the factory as an assembly of strictly integral means which have absolutely no tendency to become separated and are capable of resisting high temperatures. Moreover, it is possible to construct pipings of great length in a very simple manner with a number of similar pipes by fitting the ends of the adjacent pipes in each other with no need for special devices such as stirrups or bellows to ensure the connection therebetween. It will be understood that it is always possible in certain applications to employ insulated pipes according to the invention which have two male ends 10, the connection being achieved by means of a sleeve or the like which allows the expansion. There is no danger of the piping constructed in this way having no seal or lacking a resistance to heat, even if it has a very great length and it is thus particularly adapted to the conveyance of fluid over long distances. It will be understoood that the simplicity of assembly on the site together with the ease of transport of the insulated pipe considerably reduce the construction and maintenance costs of pipings formed from pipes according to the invention.

Furthermore, the cases 16 divide the insulation of the pipe into compartments so that there can be no damp path which would detach the foam, even in the case of a failure of the adjacent insulation placed around the junction of two adjacent pipes.

The insulated pipe $T^a$ shown in FIG. 3 has a diameter of between 150 and 1,200 to 1,600 mm. It differs from the pipe T of FIG. 1 only in the construction of the outer protective cover $6^a$ and the seal.

Indeed, the cover $6^a$ is constituted by a layer of varnish of polyurethane which is a non-cellular polyurethane and therefore compact and fluidtight. The polyurethane cover $6^a$ is disposed around the layer of insulating foam 4 in accordance with a known technique employing a projection or spraying thereof. Polyurethane is a product which is solvent free and has two components (a polyol and an isocyanate). This is why the spraying is effected by means of a gun having two components, preferably by means of an automatic airless gun. For example, there may be employed the polyurethane sold under the trademark "POLYSTAL" by the firm Société Technique d'Applications Chimiques (S.T.A.C.) and which is sprayed to a thickness of one to several millimeters.

FIG. 4 shows a direct connection between two insulated pipes $T^a$, $T'^a$ according to the invention. The structure and the manner of assembly of this connection are identical to those described with reference to FIG. 2 apart from the constitution of the cover $6^a$.

As in the case shown in FIG. 2, in use, the water or other hot fluid travels through the inner pipes 1 in succession and heats these pipes, that is to say, causes the thermal expansion thereof. Under the effect of this expansion, the male end 10 has a tendency to slide on the sealing element 26 inwardly of the socket 12. The nature of the coating 22 allows this sliding while however ensuring a constant sealed contact therebetween and the sealing element so that the seal is in no way destroyed by the thermal expansion.

The expansion produced by the circulation of hot fluid in the pipe $T^a$, $T'^a$ causes a deformation of the insulating foam 4 at the interface thereof with the pipe 1 so as to allow it to accompany the latter. On the other hand, the outer cover $6^a$ undergoes practically no rise in temperature since it is thermally insulated by the presence of the foam. Moreover, the manner of burying the pipes and the nature of the ground receiving them are sufficient in many cases to ensure a sufficient anchoring of the cover $6^a$ by the effect of friction, notwithstanding the absence of projections on the outer surface of the cover. The choice of the polyurethane provides the desired coefficient of friction between the cover and the ground.

However, the insulating foam 4 has sufficient flexibility to be able to become deformed and follow the expansion of the pipe 1 without becoming detached from the fixed cover $6^a$. Moreover, the case 16 is also sufficiently elastic to adapt itself to the expansion of the pipe 10 and remains solidly integral with the end of the cover $6^a$ which enables the insulation to withstand large thermal expansions with no danger of being deteriorated and consequently retains its effectiveness for a long time. In other words, the combination of the foam, the relatively rigid and fixed cover and the elastically yieldable end cases permits, as in the embodiment shown in FIGS. 1 and 2, accomodating a radial gradient of expansion within the foam between the pipe and the fixed cover.

The embodiment shown in FIGS. 3 and 4 has the same advantages as that shown in FIGS. 1 and 2 to which there are added other advantages described hereinunder due to the constitution of the cover $6^a$.

The polyurethane layer $6^a$ constituting the outer sealing cover is applied by projection or spraying. Consequently, this operation is rapid and easy and not hindered by possible irregularities in the outer surface of the insulating foam layer 4. Also note that the tacky time, that is to say, the time at the end of which the pipe may be handled without deteriorating the coating, is short, namely of the order of 5 minutes. This embodiment also provides a further important advantage: to form the layer of polyurethane constituting the sealing cover $6^a$, there may be used the same equipment as that which was used for forming the insulating layer 4 or a very similar equipment. The seal produced by the cover $6^a$ is absolute even at the ends of the pipe since this cover $6^a$ covers the end of each case 16 and the attachment of the cover on the foam 4 is excellent and superior to the cohesion of this foam. In the case of a tearing force, rupture occurs rather within the mass of the foam 4 than at the interface between the latter and the cover $6^a$.

Having now described my invention what I claim as new and desire to secure by Letters Patent is:

1. A large-diameter insulated pipe for conveying fluids at high temperature comprising an inner pipe, an outer protective layer, a foam of thermally insulating plastics material which is interposed between the inner pipe and outer layer and adheres to the inner pipe and to the outer layer and which covers a major part of the inner pipe but terminates at a distance from each of the ends of the inner pipe in a portion having an inclined surface of substantially frustoconical shape, said outer layer comprising a cover which is relatively rigid and terminates before reaching each frustoconical surface and a protective case for each of the frustoconical surfaces of the foam which case is at one end fixed to the cover and at the other end directly integral with the inner pipe, said case having sufficient elasticity to allow the foam to follow the expansion of the inner pipe while the cover remains immobilized.

2. A pipe as claimed in claim 1, wherein the foam has a density which is higher at the interfaces between the foam and the inner pipe and the cover than within the mass of the foam.

3. A pipe as claimed in claim 1, comprising a fixing collar which renders the case integral with the inner pipe.

4. A pipe as claimed in claim 1, comprising a male end constituted by a smooth end portion and a coating of a heat-resistant plastics material which covers the male end and is capable of having a sealed and sliding contact with a sealing element.

5. A pipe as claimed in claim 1, comprising a female end portion defining a cavity which is for housing a sealing element, a coating of a heat-resistant plastics material covering said cavity.

6. A pipe as claimed in claim 1, wherein the protective case for the ends of the insulating foam is constituted by a sheet of rubber.

7. A pipe as claimed in claim 1, wherein the insulating foam material is a material which has been cold sprayed onto the inner pipe.

8. A pipe as claimed in claim 7, wherein said foam material is polyurethane and has a density of the order of 80 to 120 kg/cu.meter.

9. A pipe as claimed in claim 1, wherein the cover is helically wound around the foam material.

10. A pipe as claimed in claim 1, wherein the cover comprises projections on the outer surface thereof for anchoring the cover.

11. A pipe as claimed in claim 10, wherein the anchoring projections of the cover are formed by gravel embedded in the outer surface of the cover which ensure that the cover is immobilized axially with respect to the ground.

12. A pipe as claimed in claim 1, wherein the outer cover is formed by a band of bitumen provided with a non-woven reinforcement.

13. A pipe as claimed in claim 1, wherein the outer cover is formed by a band of a mixture of bitumen and elastomer.

14. A pipe as claimed in claim 5, wherein the cavity for housing the sealing element comprises a bored inner end the diameter of which bored end is capable of ensuring a maximum compression of the sealing element of 25%.

15. A pipe as claimed in claim 5, wherein the female end portion of the pipe comprises an entrance abutment the diameter of which abutment is a function of the desired compression of the sealing element.

16. A pipe as claimed in claim 1, wherein the cover is constituted by a layer of non-cellular polyurethane.

17. A pipe as claimed in claim 16, wherein the cover is disposed around the layer of foam by a spraying of the cover.

18. A pipe as claimed in claim 1, wherein the cover extends and overlaps an adjacent end portion of each case.

* * * * *